UNITED STATES PATENT OFFICE.

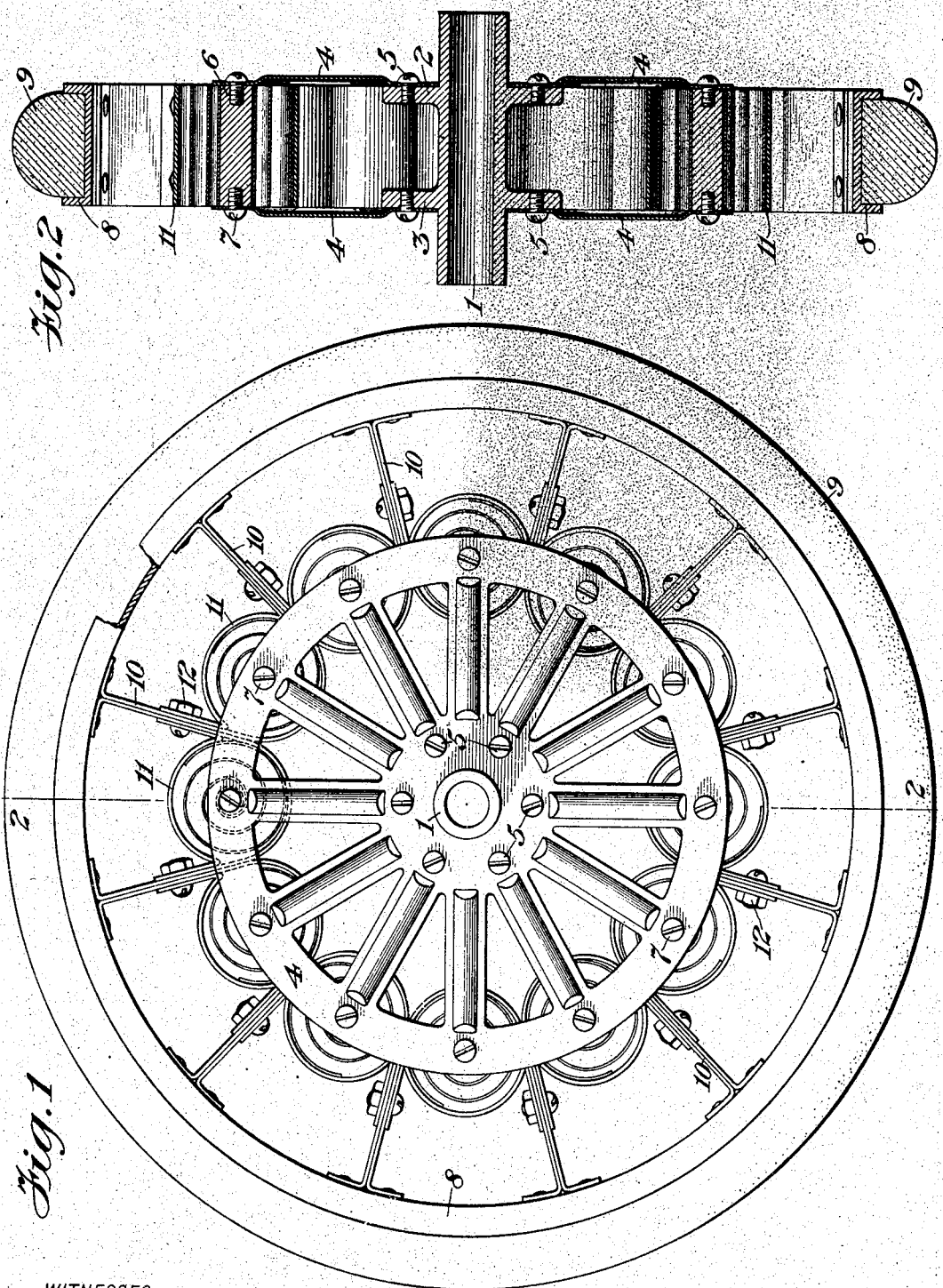

EDWARD V. HARTFORD, OF NEW YORK, N. Y., AND AUGUST W. SCHEUBER, OF HOBOKEN, NEW JERSEY; SAID SCHEUBER ASSIGNOR TO SAID HARTFORD.

SPRING-WHEEL.

No. 823,529.  Specification of Letters Patent.  Patented June 19, 1906.

Application filed June 22, 1905. Serial No. 266,518.

*To all whom it may concern:*

Be it known that we, EDWARD V. HARTFORD, a resident of New York city, county and State of New York, and AUGUST WILLIAM SCHEUBER, a resident of the city of Hoboken, county of Hudson, and State of New Jersey, citizens of the United States, have invented certain new and useful Improvements in Spring-Wheels for Vehicles, of which the following is a full, clear, and exact specification.

Our invention relates to certain new and useful improvements in spring-wheels; and it consists of the combinations and parts hereinafter more particularly described.

In vehicles of all kinds, and especially in automobiles, heavy trucks, cars, &c., one of the great difficulties which has been present is the excessive vibration communicated to the running-gear and body and which is caused by the unevenness of the road or way over which the vehicle is traveling. This vibration is not only disagreeable to the occupants, but is a serious cause of deterioration and breakage of the vehicle itself and likewise of any fragile cargo which it may happen to contain. Various means have been devised for preventing the transmission of these harmful vibrations—such, for instance, as the interposition of suspension-springs between the running-gear and body portion of the vehicle; but while these aid in preventing the shocks being transmitted to the body they are ineffective for this purpose, so far as the running-gear is concerned. To the latter end, therefore, it has been customary to employ rubber or pneumatic tires on the wheels, and the use of a spring mechanism interposed between the hub and rim of the wheel has also been tried. Rubber tires, however, when large enough to be at all effective are exceedingly expensive, and for heavy traffic pneumatic tires are not strong enough to support the great weight imposed upon them without great danger of exploding, and they are, furthermore, liable to rapid deterioration. In the spring-wheels heretofore in use a difficulty has been found in that the springs employed must be distributed uniformly around the wheel, and by reason of their construction a fraction only of said springs are in use and under tension at a given time, depending upon the position of the wheel. Difficulty has also been experienced in the use of such springs by reason of the lack of rigidity or strength of the wheel; and the object of our present invention is to produce a wheel in which a spring or yielding means is inserted between the rim and the hub, but which will be compact and strong and in which all the springs are under a uniform tension irrespective of the load or torque which is placed upon them.

In the drawings illustrating one way of constructing our invention, Figure 1 is a side elevation of our wheel, showing its various details of construction. Fig. 2 is a cross-sectional view taken on lines 2 2 of Fig. 1.

In the drawings, 1 indicates the hub of the wheel, which is provided with suitable flanges 2 3. To the outside of these flanges spider-shaped frames or spoke-plates 4 are secured by means of screws or bolts 5, and equidistant around the peripheries of said spoke-plates are secured spoke-connecting rods or shafts 6, screws 7 passing through proper holes in the spoke-plates and into the ends of the rods being used for this purpose. The spoke-connecting rods are in this particular form of construction located at the ends of the spokes proper, as by such location a stronger construction is obtained.

The foregoing-described mechanism constitutes what may be designated as the "inner" wheel, all parts of which are rigid with respect to each other. It now only remains to describe the outer wheel mechanism and the yielding means for connecting the inner wheel thereto. The outer wheel comprises the rim 8, preferably channeled or recessed to more easily receive the small rubber tire 9.

In practice we prefer the use of a small rubber or other elastic tire, as its use will be found to be beneficial and as such small tire is comparatively inexpensive. It is not, however, necessary to the purpose of our invention, and hard or metal tires of any well-known character may be employed. Within the rim 8, as will be seen from Fig. 1 of the drawings, there are a series of spokes arranged equidistant around the rim. While these spokes may be of any desired form or character, we prefer to construct them of flat metal strips U-shaped in outline, the ends of each two adjacent strips being bolted together and forming one spoke. The rounded or bottom portion of the U-shaped plates can also be utilized as a portion of the wall of the spring-retaining seats or cylinders, which cylinders are completed by the addition of detachable segments 11, secured in place by means of bolts 12.

The spring-suspension means shown consists of a spiral spring disposed, as indicated in Fig. 1, its periphery being in close contact with the walls of the cylinder for spring-seat, as shown. The inner end or portion is connected to the spoke-connecting rod or shaft and may be either held in place by its own tension or may be pinned to such rod by any well-known means. By having the spring-seats or cylinders formed of separate segments, one of which is removable, an easy means is provided for the replacement of any individual spring should it become broken or for any other reason need to be replaced, as will be seen.

As will be readily seen in our construction, each spring has a universal movement, and any weight placed upon the wheel will exert a constant and uniform tension on all of said springs, no matter what the position of the wheel may be. In like manner any torque or traction force applied to the wheel is transmitted uniformly to all of said springs, and they therefore collectively serve the same function, no matter what position the wheel may be in or the weight or strain upon it. It will be also seen that by reason of the construction shown all relative lateral movement of the inner and outer wheel portions is prevented, and while the hub moves in the desired plane when the wheel is under tension it has no lateral or disadvantageous movement.

It is obvious that many modifications and changes may be made in our invention from the particular embodiment shown, and we do not limit ourselves to any specific construction; but

What we claim, and desire to secure by Letters Patent, is—

1. A vehicle-wheel comprising a hub, a series of radiating spokes symmetrically disposed thereon, a rim and a series of inwardly-extending spokes attached thereto, each pair of spokes being connected at their inner ends forming a spring-seat, a spiral spring within each seat, removable means for holding said spring in place and a connection between said spring and said hub-spokes, substantially as described.

2. A vehicle-wheel comprising a hub, a series of radiating spokes symmetrically disposed thereon, a rim and a series of inwardly-extending spokes attached thereto, each pair of spokes being connected at their inner ends forming a spring-seat, a spiral spring within each seat, removable means for holding said spring in place and a connection between the outer end of said hub-spokes and the inner end of said spiral springs, substantially as described.

3. A vehicle-wheel comprising a hub, spoke-flanges thereon, a series of radially-disposed spokes secured to said flanges, a rim, a series of inwardly-extending spokes attached thereto, each pair of spokes being connected at their inner ends forming spring-seats and overlapping the outer ends of the hub-spokes, a spiral spring within each seat, removable means for holding said spring in place, and a connection between said spring and the hub-spokes, substantially as described.

4. A vehicle-wheel comprising a hub, spoke-flanges thereon, a series of radially-disposed spokes secured to said flanges, a rim, a series of inwardly-extending spokes attached thereto, each pair of spokes being connected at their inner ends forming spring-seats and overlapping the outer ends of the hub-spokes, a spiral spring within each seat, removable means for holding said spring in place, and a connection between the outer ends of said hub-spokes and the inner ends of said spiral springs, substantially as described.

5. A vehicle-wheel comprising a hub, spoke-flanges thereon, a series of radially-disposed bifurcated spokes secured to said flanges, a rim, a series of inwardly-extending spokes attached thereto, each pair of spokes being connected at their inner ends forming spring-seats and overlapping the outer ends of the hub-spokes, a spiral spring within each seat, removable means for holding said spring in place and a rod connecting the outer end of each of said bifurcated spokes and attached to the inner end of said spiral spring, substantially as described.

6. A vehicle-wheel comprising a hub, a rim having a plurality of seats or spring-retaining cylinders provided with removable sections, and a series of spiral springs located one in each of the said seats and having their centers connected to the hub of the wheel.

7. A vehicle-wheel comprising a hub, a rim having a plurality of U-shaped spokes the inner ends of which are formed into spring seats or recesses, and a series of spiral springs located one in each of said seats and a connection between the center of each of said springs and the hub of the wheel.

8. A vehicle-wheel comprising a hub provided with two sets of radiating spokes symmetrically disposed about said hub, connecting means or rods located at the outer ends of each pair of spokes, a series of independently-removable spiral springs the inner portions of which are connected to said spoke-connecting rods, a rim and connecting means between said rim and the outer portions of said springs.

9. A vehicle-wheel comprising a hub provided with two sets of radiating spokes symmetrically disposed about said hub, connecting rods or shafts at the outer ends of each pair of spokes, a series of spiral springs the inner portions of which are connected to said spoke-connecting rods, a rim having a plurality of spokes extending within the same and cylindrical seats at the inner ends of said spokes in which the spiral springs are located.

10. A vehicle-wheel comprising a hub provided with two sets of radiating spokes symmetrically disposed about said hub, connecting rods or shafts located at the outer ends of each pair of spokes, a series of spiral springs the inner portions of which are connected to said spoke-connecting rods, a rim having a plurality of spokes extending within the same cylindrical seats at the inner ends of said spokes and in which the spiral springs are located and which embrace and hold firmly the periphery of said spring and removable segments or sections to said seats to permit the removing of individual springs.

In testimony whereof we have hereunto set our hands in the presence of two subscribing witnesses.

EDWARD V. HARTFORD.
AUGUST W. SCHEUBER.

Witnesses as to Edward V. Hartford:
CHAS. D. KING,
ADOLPH F. DINSE.

Witnesses as to August W. Scheuber:
WM. E. MCREYNOLDS,
ADOLPH F. DINSE.